(12) United States Patent
Yasui et al.

(10) Patent No.: US 9,481,148 B2
(45) Date of Patent: Nov. 1, 2016

(54) HIGH-CORROSION-RESISTANCE HOT-DIP GALVANIZED STEEL SHEET HAVING EXCELLENT APPEARANCE UNIFORMITY AND MANUFACTURING METHOD THEREOF

(75) Inventors: Takeshi Yasui, Tokyo (JP); Tooru Oohashi, Tokyo (JP); Nayuta Kawazu, Tokyo (JP); Satoru Tanaka, Tokyo (JP); Akio Saito, Tokyo (JP)

(73) Assignee: NIPPON STEEL AND SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 14/127,780

(22) PCT Filed: Jun. 29, 2012

(86) PCT No.: PCT/JP2012/066655
§ 371 (c)(1),
(2), (4) Date: Dec. 19, 2013

(87) PCT Pub. No.: WO2013/002358
PCT Pub. Date: Jan. 3, 2013

(65) Prior Publication Data
US 2014/0127531 A1 May 8, 2014

(30) Foreign Application Priority Data
Jun. 30, 2011 (JP) .................... 2011-146572

(51) Int. Cl.
*B32B 15/01* (2006.01)
*C23C 2/00* (2006.01)
(Continued)

(52) U.S. Cl.
CPC ............. *B32B 15/013* (2013.01); *B32B 15/01* (2013.01); *C22C 18/00* (2013.01); *C22C 18/04* (2013.01); *C23C 2/02* (2013.01); *C23C 2/06* (2013.01); *Y10T 428/12799* (2015.01)

(58) Field of Classification Search
CPC .......... B32B 15/01; Y10T 428/12799; C22C 18/00
USPC ........................................ 428/659
See application file for complete search history.

(56) References Cited

U.S. PATENT DOCUMENTS

| | | | |
|---|---|---|---|
| 6,465,114 B1 | 10/2002 | Honda et al. | |
| 2003/0072963 A1 | 4/2003 | Komatsu et al. | |
| 2004/0258949 A1 | 12/2004 | Honda et al. | |

FOREIGN PATENT DOCUMENTS

| | | |
|---|---|---|
| CN | 1342211 A | 3/2002 |
| CN | 1612947 A | 5/2005 |

(Continued)

OTHER PUBLICATIONS

English Machine Translation of JPH08-170160, JPO, accessed Dec. 5, 2014.*

(Continued)

*Primary Examiner* — Humera Sheikh
*Assistant Examiner* — Lucas Wang
(74) *Attorney, Agent, or Firm* — Birch, Stewart, Kolasch & Birch, LLP

(57) ABSTRACT

The present invention provides a high-corrosion-resistance hot-dip galvanized steel sheet having excellent appearance uniformity. The steel sheet includes: a coating layer containing Al: 4 to 22 mass %, Mg: 1 to 6 mass %, and Si: 0.001 to 1 mass %, and a balance being composed of Zn and inevitable impurities formed on a surface, in which at an interface between the coating layer and a base steel sheet, $Mg_2Si$ phases and Ca phases each mainly composed of Ca or a Ca compound exist, and at least part of the $Mg_2Si$ phases precipitate by using the Ca phases as a nucleus.

5 Claims, 4 Drawing Sheets

(51) Int. Cl.
*C23C 2/02* (2006.01)
*C23C 2/06* (2006.01)
*C22C 18/00* (2006.01)
*C22C 18/04* (2006.01)

(56) References Cited

FOREIGN PATENT DOCUMENTS

| | | |
|---|---|---|
| CN | 101260502 A | 9/2008 |
| EP | 1 199 376 A1 | 4/2002 |
| JP | 8-170160 A | 7/1996 |
| JP | 2001-295015 A | 10/2001 |
| JP | 2001-355055 A | 12/2001 |
| JP | 2007-169752 A | 7/2007 |
| WO | 00/71773 A1 | 11/2000 |

OTHER PUBLICATIONS

English Machine Translation of JP2001-355055, JPO, accessed Dec. 5, 2014.*
International Search Report issued in PCT/JP2012/066655, mailed on Sep. 18, 2012.

* cited by examiner (a)

(b)

US 9,481,148 B2

HIGH-CORROSION-RESISTANCE HOT-DIP GALVANIZED STEEL SHEET HAVING EXCELLENT APPEARANCE UNIFORMITY AND MANUFACTURING METHOD THEREOF

TECHNICAL FIELD

The present invention relates to a hot-dip galvanized steel sheet. More specifically, the present invention relates to a high-corrosion-resistance hot-dip galvanized steel sheet that has excellent appearance uniformity regardless of uniformity of cleanliness of a base steel sheet and is applicable as steel sheets for various uses of for example, home electric appliances, automobiles, and building materials.

BACKGROUND ART

There is a hot-dip galvanized steel sheet to be used as a steel sheet having good corrosion resistance. This hot-dip galvanized steel sheet is widely used in various manufacturing industries such as in automobile, home electric appliance, and building material fields.

As a manufacturing method of the hot-dip galvanized steel sheet, a method in which a cold-rolled steel sheet or a hot-rolled steel sheet is used as a base steel sheet and the base steel sheet is passed through a continuous hot-dip galvanizing line, (which will be referred to as a CGL, hereinafter), to manufacture a hot-dip galvanized steel sheet is general. As a process of the CGL, it is general to use a total reducing furnace method in which in a cleaning section on the entrance side, the base steel sheet is subjected to alkaline spray degreasing and then is subjected to brush cleaning, and in an annealing section, is subjected to annealing in a reducing atmosphere to be dipped in a hot-dip galvanizing bath. Further, there is also a case to use a Sendzimir method in which at the stage prior to the annealing section, a non-oxidizing furnace is provided, and the surface-cleaned base steel sheet is preliminarily heated in the non-oxidizing furnace and then is subjected to reduction annealing in a reducing furnace to then be dipped into a hot-dip galvanizing bath.

For the purpose of further improving corrosion resistance of a hot-dip galvanized steel sheet manufactured by the process as described above, there has been proposed a high-corrosion-resistance hot-dip galvanized steel sheet with a hot-dip galvanizing layer having Al and Mg added thereto. For example, in Patent Document 1, there has been proposed a hot-dip Zn—Al—Mg—Si coated steel sheet. Further, in Patent Document 1, it has been proposed that to this hot-dip Zn—Al—Mg—Si coated steel sheet, one or two or more of Ca, Be, Ti, Cu, Ni, Co, Cr, and Mn is/are added, to thereby make it possible to obtain a coated steel sheet having further excellent corrosion resistance.

Further, in Patent Document 2, it has been disclosed that Ti, B, and Si are added to a hot-dip Zn—Al—Mg coated steel sheet to thereby improve its outward appearance.

PRIOR ART DOCUMENT

Patent Document

Patent Document 1: International Publication No. WO2000/071773

Patent Document 2: Japanese Laid-open Patent Publication No. 2001-295015

DISCLOSURE OF THE INVENTION

Problems to be Solved by the Invention

However, in the above-described coated steel sheets, and additionally in coated steel sheets that have been disclosed up to now, appearance uniformity has not been secured enough to be satisfactory.

A Zn—Al—Mg ternary alloy has a ternary eutectic point of a composition of 3 mass % Mg-4 mass % Al-93 mass % Zn, and thus when hot-dip coating is performed by using a coating bath having a composition with concentration of Al higher than it, a coating layer is mainly constituted of three types of phases of an Al phase, an $MgZn_2$ phase, and an $Al/MgZn_2/Zn$ ternary eutectic phase. Further, when the coating layer contains Si in addition to Zn, Al, and Mg, it is mainly constituted of four types of phases including an $Mg_2Si$ phase, in addition to the above-described three types of phases.

In FIG. 1, there is shown an example of a cross-sectional structure of a hot-dip Zn—Al—Mg—Si coating layer constituted of constituent phases as above. 1 denotes a coating original sheet, each 2 denotes an Al phase, each 3 denotes an $MgZn_2$ phase, each 4 denotes an $Al/MgZn_2/Zn$ ternary eutectic phase, and each 5 denotes an $Mg_2Si$ phase.

In FIG. 2, there is shown an example of an outward appearance of the hot-dip Zn—Al—Mg—Si coating layer having the cross-sectional structure as shown in FIG. 1. 6 denotes a place where there are a lot of $Al/MgZn_2/Zn$ ternary eutectic phases on a surface, which has a metallic luster. 7 denotes a place where Al phases are exposed to the surface, which has a white appearance.

In hot-dip Zn—Al—Mg—Si coating, first, the $Mg_2Si$ phases are formed on a base steel sheet in a coating bath. Then, as described previously, when concentration of Al is higher than a ternary eutectic point composition, in a cooling process after the base steel sheet is pulled out of the coating bath, the Al phases crystallize in a dendrite form from a liquid phase. Subsequently, the $MgZn_2$ phases crystallize and finally the $Al/MgZn_2/Zn$ ternary eutectic phases solidify, and solidification of the liquid phase is completed. The place where at the time of the solidification of the $Al/MgZn_2/Zn$ ternary eutectic phases, dendritic portions of the Al phases being a primary crystal break through a surface of a melt to be exposed to the surface of the coating corresponds to the white portion denoted by 7 in FIG. 2. Further, the place where the $Al/MgZn_2/Zn$ ternary eutectic phases solidify so as to cover a surface layer of the coating layer corresponds to the metallic luster portion denoted by 6 in FIG. 2. As there are more dendritic portions of the Al phases exposed to the surface of the coating layer, degree of luster of a visual appearance of the whole coating layer becomes lower and degree of whiteness becomes higher.

In the manufacturing process of the hot-dip galvanized steel sheet as described previously, when a rust preventive oil and a rolling oil on the surface of the coating original sheet are removed completely in the cleaning section on the entrance side of the CGL, and thereafter annealing and coating are performed, on the whole surface of the coating original sheet, solidification reaction from the liquid phase as described previously occurs uniformly in the order of the $Mg_2Si$ phase, the Al phase, the $MgZn_2$ phase, and the $Al/MgZn_2/Zn$ ternary eutectic phase. As a result, on the whole surface of the coating layer, as shown in FIG. 2, the outward appearance of which the dendritic portions of the Al phases are uniformly distributed in the $Al/MgZn_2/Zn$ ternary eutectic phases is obtained.

However, in the cleaning section on the entrance side of the CGL, there is sometimes a case that the rust preventive oil and the rolling oil are accumulated in an alkaline degreasing liquid and thus degreasing ability of the degreasing liquid decreases and a cleaning brush is abraded partially and thus the cleaning becomes insufficient. When the cleaning becomes insufficient, oil-dirt is sometimes left locally on the base steel sheet even after the base steel sheet is passed through the cleaning section.

In the CGL as above, it became clear that when annealing and coating are performed by using the base steel sheet on which oil-dirt is left locally, in the surface layer of the coating immediately on an oil-dirt portion, the degree of luster of the coating layer becomes extremely higher as compared to another portion. Such an oil-dirt remaining portion of the coating original sheet occurs locally and irregularly, so that a coating appearance such that a place with a high degree of luster is irregularly mixed in the appearance of which the dendritic portions of the Al phases are uniformly distributed in the Al/MgZn$_2$/Zn ternary eutectic phases is obtained, to thus cause a problem that the appearance uniformity deteriorates.

However, in the technique disclosed in Patent Document 1 described above, no consideration is given to the appearance uniformity in the case when oil-dirt is locally left on the base steel sheet. Further, although one or two or more of Ca, Be, Ti, Cu, Ni, Co, Cr, and Mn is/are added for the purpose of improving the corrosion resistance after the coating, no consideration is given to the problem that the appearance uniformity deteriorates by the local oil-dirt remaining on the base steel sheet. Further, in the technique disclosed in Patent Document 2 described above, although Ti and B are added for the purpose of suppressing generation and growth of $Zn_{11}Mg_2$ phases to deteriorate the outward appearance, no consideration is given to the problem of the deterioration of appearance uniformity ascribable to the local oil-dirt remaining on the base steel sheet.

The present invention has been made in consideration of the above-described problems, and has an object to provide a high-corrosion-resistance hot-dip galvanized steel sheet having excellent appearance uniformity regardless of uniformity of cleanliness of a base steel sheet.

Means for Solving the Problems

The present inventors first examined the reason why in an oil-dirt remaining portion on a base steel sheet, degree of luster of a coating layer becomes high. As a result, immediately on the oil-dirt remaining portion on the base steel sheet, the size of an Al phase being a primary crystal was not different from that of a normal portion at the time of solidification from a liquid phase after pulling out of a coating bath. However, it was ascertained that immediately on the oil-dirt remaining portion, the degree of luster increases because Al/MgZn$_2$/Zn ternary eutectic phases being a final solidification phase are made fine. Next, they earnestly examined a method capable of securing the appearance uniformity even though the base steel sheet is such that oil-dirt is left locally thereon. As a result, it became clear that Ca phases each mainly composed of Ca or a Ca compound are made to exist at an interface between the coating layer and the base steel sheet, and thereby the Al/MgZn$_2$/Zn ternary eutectic phases are made fine regardless of presence or absence of oil-dirt on the base steel sheet. The present inventors found the new knowledge that the Al/MgZn$_2$/Zn ternary eutectic phases are made fine by using the Ca phases as a starting point, and thereby the degree of luster of the coating layer increases overall and the appearance uniformity improves, and then reached completion of the present invention.

That is, the gist of the present invention is as follows.

[1]

A high-corrosion-resistance hot-dip galvanized steel sheet having excellent appearance uniformity, includes:

a coating layer containing Al: 4 to 22 mass %, Mg: 1 to 6 mass %, and Si: 0.001 to 1 mass %, and a balance being composed of Zn and inevitable impurities formed on a surface, in which at an interface between the coating layer and a base steel sheet, Mg$_2$Si phases and Ca phases each mainly composed of Ca or a Ca compound exist, and at least part of the Mg$_2$Si phases precipitate by using the Ca phases as a nucleus.

[2]

The high-corrosion-resistance hot-dip galvanized steel sheet having excellent appearance uniformity according to [1], in which a density of the Mg$_2$Si phases each having a circle-equivalent diameter of 2 μm or more out of the Mg$_2$Si phases existing at the interface between the coating layer and the base steel sheet is 10 to 1000 pieces per 0.01 mm$^2$

[3]

The high-corrosion-resistance hot-dip galvanized steel sheet having excellent appearance uniformity according to [1], in which an average diameter of Al/MgZn$_2$/Zn ternary eutectic phases existing in the coating layer is 5 to 200 μm.

[4]

The high-corrosion-resistance hot-dip galvanized steel sheet having excellent appearance uniformity according to [1], in which the coating layer further contains 0.000001 to 0.5 mass % of one or two or more selected from Ti, Ni, Zr, Sr, Hf, Sc, and B alone or in combination.

[5]

A manufacturing method of a high-corrosion-resistance hot-dip galvanized steel sheet having excellent appearance uniformity, includes:

a step of bonding Ca phases each mainly composed of Ca or a Ca compound to a surface of a base steel sheet;

a step of annealing the base steel sheet having had the Ca phases bonded to the surface; and a step of dipping the base steel sheet into a hot-dip galvanizing bath containing Al: 4 to 22 mass %, Mg: 1 to 6 mass %, and Si: 0.001 to 1 mass %, and a balance being composed of Zn and inevitable impurities and performing hot-dip galvanizing.

[6]

The manufacturing method of the high-corrosion-resistance hot-dip galvanized steel sheet having excellent appearance uniformity according to [5], in which in the step of bonding Ca or a Ca compound to the surface of the base steel sheet, the base steel sheet is dipped into a hot water containing Ca of 10 to 40 mass ppm and having a temperature of 50 to 90° C. for 1 to 100 s.

Effect of the Invention

According to the present invention, there is provided a high-corrosion-resistance hot-dip galvanized steel sheet having excellent appearance uniformity regardless of uniformity of cleanliness of a base steel sheet.

BRIEF DESCRIPTION OF THE DRAWINGS

FIG. 1(a) is a micrograph of a coating layer (2000 magnifications) and FIG. 1(b) is a view showing a distribution state of respective structures in the micrograph;

FIG. 3(a) shows a result of an element distribution of Si, FIG. 3(b) shows a result of an element distribution of Mg, FIG. 3(c) shows a result of an element distribution of Ca, FIG. 3(d) shows a result of an element distribution of Zn, and FIG. 3(e) shows a cross-sectional structure of respective constituent phases estimated from the results of the EPMA analysis;

MODE FOR CARRYING OUT THE INVENTION

Figure 1:
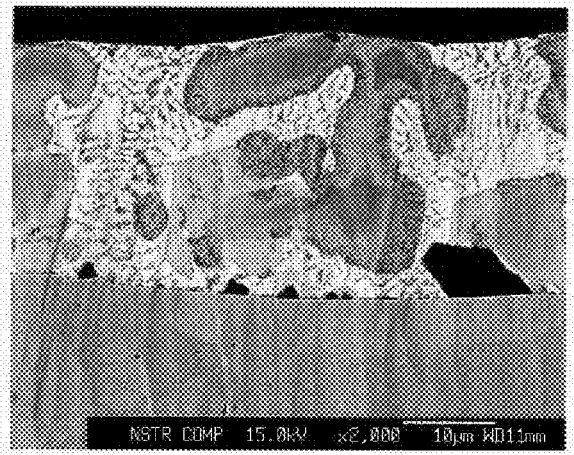
FIG. 1 are views each showing one example of a cross-sectional structure of a hot-dip Zn—Al—Mg—Si coated steel sheet.
Figure 1:
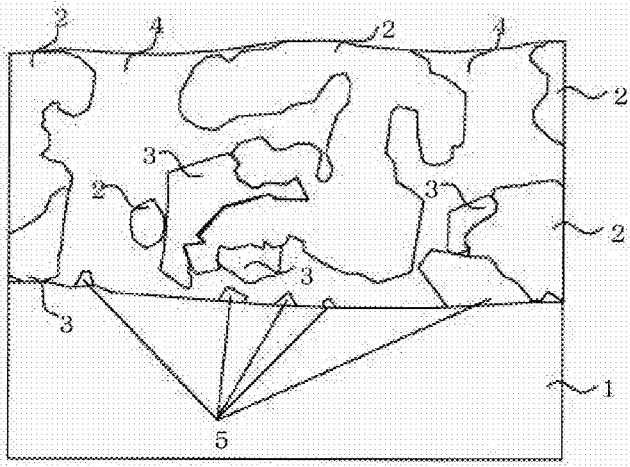
Figure 2:
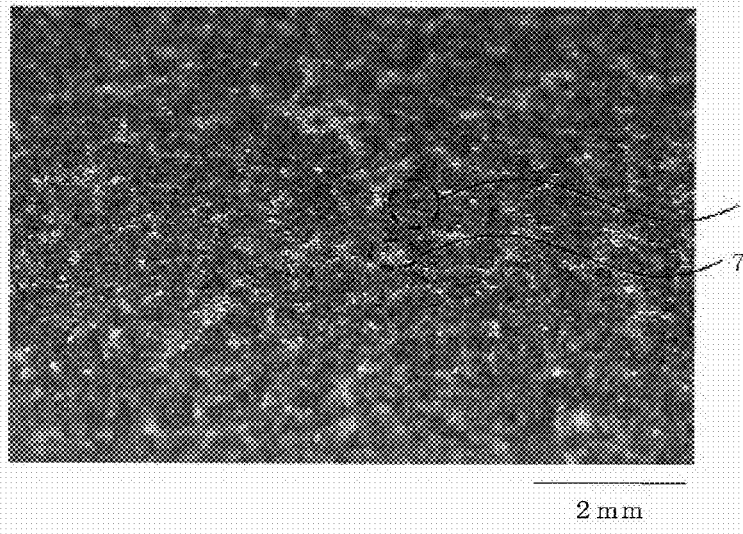
FIG. 2 is a photograph showing one example of an outward appearance of the hot-dip Zn—Al—Mg—Si coated steel sheet.

Hereinafter, the present invention will be explained in detail. The present invention relates to a high-corrosion-resistance hot-dip galvanized steel sheet having excellent appearance uniformity that has a coating layer formed on a surface of a base steel sheet.

(Base Steel Sheet)

As a base steel sheet (coating original sheet) to be used for a base for coating, a hot-rolled steel sheet and a cold-rolled steel sheet can be both used, and a variety of steel types such as an Al killed steel, an ultralow carbon steel sheet having Ti, Nb, and the like added thereto, a high-strength steel in which strengthening elements such as P, Si, and Mn are added to these, and a stainless steel can also be applied. Further, with regard to a hot rolling condition, a cold rolling condition, and so on, predetermined conditions may be selected according to the size of the steel sheet and the required strength, and the effect of the steel sheet of the present invention is not impaired by a hot rolling condition, a cold rolling condition, and so on. Further, the sheet thickness of the steel sheet is not limited in particular and as long as the steel sheet has a sheet thickness to be used normally, the present invention is applicable.

(Coating Layer)

In the present invention, a coating layer contains Al: 4 to 22 mass %, Mg: 1 to 6 mass %, Si: 0.001 to 1 mass %, and a balance being composed of Zn and inevitable impurities.

In the present invention, Al in the coating layer is an element necessary for securing planar surface portion corrosion resistance. The reason why the content of Al in the coating layer is limited to 4 to 22 mass % is because if it is less than 4 mass %, an effect of improving the corrosion resistance is insufficient and if it exceeds 22 mass %, the effect of improving the corrosion resistance is saturated. In terms of the corrosion resistance, it is preferably set to 5 to 18 mass %. It is more preferably set to 6 to 16 mass %.

In the present invention, Mg in the coating layer is an element essential for improving the planar surface portion corrosion resistance and worked portion corrosion resistance. The reason why the content of Mg in the coating layer is limited to 1 to 6 mass % is because if it is less than 1 mass %, an effect of improving the worked portion corrosion resistance is insufficient and if it exceeds 6 mass %, dross occurrence in a coating bath becomes significant, to thereby make it difficult to manufacture the hot-dip galvanized steel sheet stably. In terms of the balance between the corrosion resistance and the dross occurrence, it is preferably set to 1.5 to 5 mass %. It is more preferably set to be in a range of 2 to 4.5 mass %.

In the present invention, Si in the coating layer is an element effective for improving coating adhesiveness. An effect of improving the coating adhesiveness appears when 0.001 mass % or more is contained, so that 0.001 mass % is set to the lower limit. Further, even when Si of greater than 1 mass % is contained, the effect of improving the coating adhesiveness is saturated, so that the upper limit is set to 1 mass %. In terms of the coating adhesiveness, it is more preferably set to be in a range of 0.01 to 0.8 mass %.

Further, to the coating layer, 0.000001 to 0.5 mass % of one or two or more selected from Ti, Ni, Zr, Sr, Hf, Sc, and B may also be added alone or in combination. An intermetallic compound containing this/these element/elements works as a crystallization nucleus of a primary crystal Al phase to make an $Al/MgZn_2/Zn$ ternary eutectic phase finer and more uniform, to thereby improve the appearance and smoothness of the coated steel sheet. The reason why the added mount of one or two or more selected from Ti, Ni, Zr, Sr, Hf, Sc, and B is set to 0.000001 to 0.5 mass % is because if it is less than 0.000001 mass %, an effect of making a solidification structure fine and uniform that is obtained by the addition is insufficient and if it exceeds 0.5 mass %, an effect of making the ternary eutectic phase fine is saturated, and further surface roughness of the coating layer is made large and the appearance deteriorates, and thus the upper limit is set to 0.5 mass %. When it/they is/are added for the purpose of improving the appearance, in particular, 0.0001 to 0.1 mass % is desirably added. It is more preferably set to be in a range of 0.001 to 0.05 mass %, and it is still more preferably set to be in a range of 0.002 to 0.01 mass %.

In the coating layer, in addition to this, one or two or more of Fe, Sb, Pb, and Sn may also be contained to be within 0.5 mass %. Further, even when one or two or more of group 3 elements such as Ca, Be, Cu, Co, Cr, Mn, Mo, P, Nb, V, Bi, La, Ce, and Y is/are contained to be 0.5 mass % or less in total, the effect of the present invention is not impaired, and depending on its/their amount, there is also a preferred case such that the corrosion resistance is further improved.

(Ca Phase and $Mg_2Si$ Phase)

Figure 3:
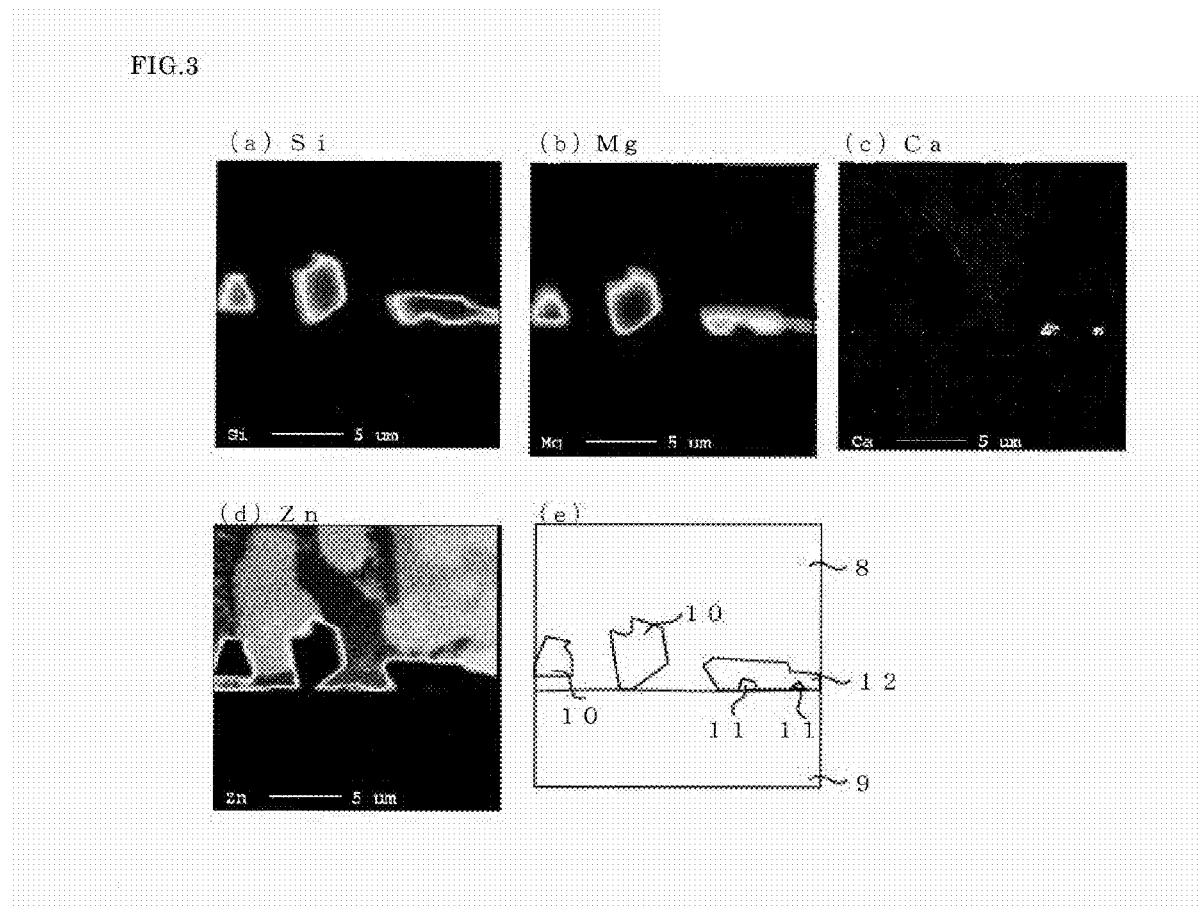
FIG. 3 are views each showing one example of data obtained by performing a cross-sectional EPMA analysis on a hot-dip galvanized steel sheet of the present invention.

In the present invention, Ca phases each mainly composed of Ca or a Ca compound exist at an interface between the coating layer and the base steel sheet, which is essential for securing the appearance uniformity. As shown in data of a cross-sectional EPMA analysis in FIG. 3, in the high-corrosion-resistance hot-dip galvanized steel sheet of the present invention, at an interface between a coating layer 8 and a base steel sheet 9, $Mg_2Si$ phases 10 and 12 and Ca phases 11 each mainly composed of Ca or a Ca compound exist. As will be described later, in the present invention, the Ca phases 11 are bonded to the surface of the base steel sheet 9 beforehand, and then hot-dip galvanizing is performed, and thereby at least part of the $Mg_2Si$ phases 10 and 12 precipitate by using the Ca phases 11 as a nucleus. In examples shown in FIG. 3, it is conceivable that the Mg$_2$Si phases 10 out of the Mg$_2$Si phases 10 and 12 have precipitated directly on the surface of the base steel sheet 9 in a step of performing hot-dip galvanizing. Further, it is conceivable that the Mg$_2$Si phases 12 have precipitated by using the Ca phases 11 bonded to the surface of the base steel sheet 9 as a nucleus. In the present invention, it is conceivable that since Mg and Si are contained in the coating layer 8, the Mg$_2$Si phases 12 precipitate by using the Ca phases 11 existing at the interface between the coating layer 8 and the base steel sheet 9 as a nucleus, and thus a number density of the Mg$_2$Si phases 10 and 12 at the interface between the coating layer 8 and the base steel sheet 9 is increased. As above, the precipitation of the Mg$_2$Si phases 10 and 12 at the interface between the coating layer 8 and the base steel sheet 9 is promoted and the Mg$_2$Si phases 10 and 12 precipitate densely, to thereby make the Al/MgZn$_2$/Zn ternary eutectic phases in the coating layer 8 fine regardless of presence or absence of oil-dirt on the base steel sheet 9, resulting in that the degree of luster of the coating layer 8 increases overall and the appearance uniformity improves.

The Ca phase has Ca or a Ca compound as its main component. As the Ca compound, calcium carbonate, calcium oxide, calcium hydroxide, and the like are conceivable, but as long as the Ca compound is one containing Ca, its type is not limited in particular.

When the Ca phases exist at the interface between the coating layer and the base steel sheet, the concentration of Ca at the interface between the coating layer and the base steel sheet inevitably becomes higher as compared to that in the coating layer and that in the base steel sheet. Thus, as one example of an index indicating whether or not the Ca phases exist at the interface between the coating layer and the base steel sheet, "interface Ca intensity" at the interface between the coating layer and the base steel sheet can be used. This "interface Ca intensity" is defined by the following expression by using a Ca profile obtained by performing a GDS analysis on the hot-dip galvanized steel sheet from the surface in a depth direction.

Interface Ca intensity=(Ca peak intensity at the interface between the coating layer and the base steel sheet−background Ca intensity)/(the background Ca intensity)

Here, the "background Ca intensity" is defined as Ca intensity obtained when a GDS analysis is performed on a material containing no Ca practically, and Ca intensity obtained when a GDS analysis is performed on a high-purity iron (JSS No. 003-6) manufactured by Japan Iron and Steel Federation is employed.

Figure 4:
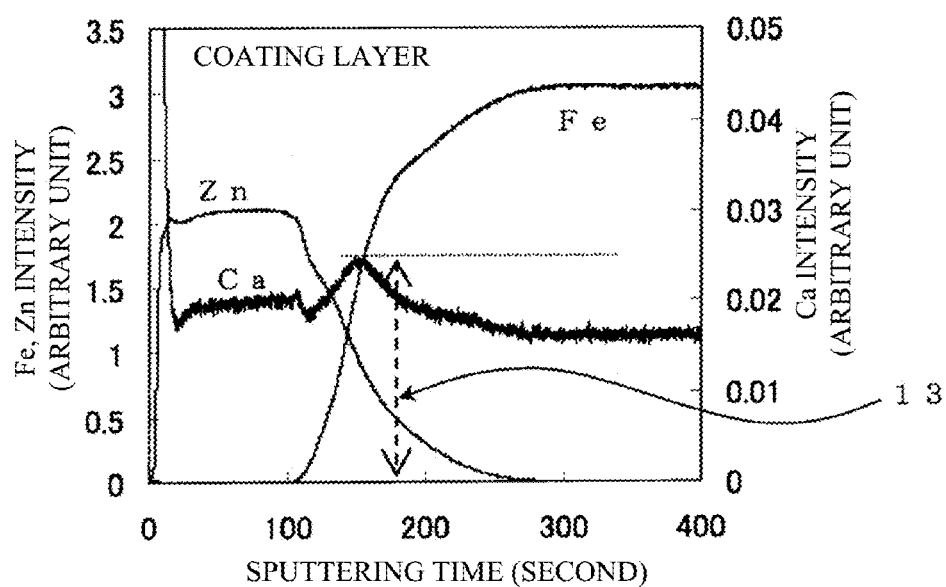
FIG. 4 is a view showing one example of a profile of Zn, Fe, and Ca in a depth direction obtained by performing a GDS depth direction analysis on the hot-dip galvanized steel sheet of the present invention.

For example, when in the hot-dip galvanized steel sheet, Zn intensity, Fe intensity, and Ca intensity are each analyzed from the surface in the depth direction by the GDS, a GDS profile as shown in FIG. 4 is obtained. In FIG. 4, 13 corresponds to the Ca peak intensity at the interface between the coating layer and the base steel sheet. In an example shown in FIG. 4, the Ca peak intensity 13 at the interface between the coating layer and the base steel sheet is 0.024, and further the background Ca intensity obtained by measuring the previously described high-purity iron (JSS No. 003-6) separately is 0.016, so that the interface Ca intensity becomes 0.5.

In the present invention, in order that the degree of luster of the coating layer should increase overall to obtain excellent appearance uniformity, the interface Ca intensity at the interface between the coating layer and the base steel sheet needs to be in a range of 0.1 to 1.0. When the interface Ca intensity is less than 0.1, the Ca phases do not exist sufficiently at the interface between the coating layer and the base steel sheet, to thereby make it impossible to secure the appearance uniformity. On the other hand, when the interface Ca intensity exceeds 1.0, reaction of the base steel sheet and molten zinc becomes unlikely to occur in the coating bath, and thus uncoating occurs. The interface Ca intensity is preferably set to be in a range of 0.15 to 1.0. It is more preferably set to be in a range of 0.2 to 1.0.

As long as the interface Ca intensity at the interface between the coating layer and the base steel sheet is in a range of 0.1 to 1.0, the Ca phases exist sufficiently at the interface between the coating layer and the base steel sheet and the Mg$_2$Si phases precipitate at the interface between the coating layer and the base steel sheet by using the Ca phases as a nucleus. As a result, the Mg$_2$Si phases precipitate densely at the interface between the coating layer and the base steel sheet, to thereby make the Al/MgZn$_2$/Zn ternary eutectic phases in the coating layer fine regardless of presence or absence of oil-dirt on the base steel sheet, resulting in that the degree of luster of the coating layer increases overall and the appearance uniformity improves. By making the Al/MgZn$_2$/Zn ternary eutectic phases fine, the degree of luster of the coating layer increases and luster appearance similar to that of the coating layer immediately on an oil-dirt portion of the base steel sheet is obtained, and consequently the appearance uniformity improves regardless of cleanliness of the base steel sheet. It is conceivable that when the Al/MgZn$_2$/Zn ternary eutectic phases are made fine, the fine Al/MgZn$_2$/Zn ternary eutectic phases solidify so as to fill dendritic portions of the Al phases being a primary crystal, and thus dendritic exposed portions of the Al phases are decreased and the metallic lustrous Al/MgZn$_2$/Zn ternary eutectic phases coat the surface of the coating.

In the present invention, since Mg and Si are contained in the coating layer, the Mg$_2$Si phases precipitate sufficiently at the interface between the coating layer and the base steel sheet by using the Ca phases existing at the interface between the coating layer and the base steel sheet as a nucleus. As a result, the Al/MgZn$_2$/Zn ternary eutectic phases in the coating layer are made fine and the appearance uniformity improves. Further, the Mg$_2$Si phases are effective for improving the worked portion corrosion resistance, so that the added amounts of Si and Mg are desirably increased to make a metal structure in which the Mg$_2$Si phases are formed at the interface between the coating layer and the base steel sheet. Incidentally, the effect of improving the worked portion corrosion resistance improves regardless of the density of the Mg$_2$Si phases.

On the other hand, in order to make the Al/MgZn$_2$/Zn ternary eutectic phases fine, a density of the Mg$_2$Si phases each having a circle-equivalent diameter of 2 μm or more out of the Mg$_2$Si phases existing at the interface between the coating layer and the base steel sheet needs to be 10 to 1000 pieces per 0.01 mm$^2$ Even though the density of the Mg$_2$Si phases each having a circle-equivalent diameter of 2 μm or more is less than 10 pieces per 0.01 mm$^2$, the effect of making the Al/MgZn$_2$/Zn ternary eutectic phase fine is obtained a little, but the density is set to 10 pieces or more, and thereby a specially high effect can be obtained, so that this is set to the lower limit. Further, even though the density is set to greater than 1000 pieces per 0.01 mm$^2$, the effect of making the Al/MgZn$_2$/Zn ternary eutectic phase fine is saturated, so that 1000 pieces per 0.01 mm$^2$ are set to the upper limit. In order to make the ternary eutectic phases finer, the density of the Mg$_2$Si phases is preferably set to be in a range of 20 pieces to 1000 pieces per 0.01 mm$^2$ Further, with regard to the Mg$_2$Si phase having a circle-equivalent diameter of less than 2 μm, the effect of making the Al/MgZn$_2$/Zn ternary eutectic phase fine is small, so that the above-described density may be limited to the Mg$_2$Si phase having a circle-equivalent diameter of 2 μm or more. Incidentally, the Mg$_2$Si phase having a circle-equivalent diameter of 2 μm or more means the Mg$_2$Si phase having an area to be equal to or larger than that of a circle having a diameter of 2 μm when measurement is performed from a surface direction of the steel sheet, out of the Mg$_2$Si phases formed at the interface between the coating layer and the base steel sheet.

The reason why the density of the Mg$_2$Si phases existing at the interface between the coating layer and the base steel sheet is increased, and thereby the effect of making the Al/MgZn$_2$/Zn ternary eutectic phase fine is increased is conceivably because the Mg$_2$Si phase has an effect of becoming a starting point where the Al/MgZn$_2$/Zn ternary eutectic phase solidifies. That is, it is conceivable that by increasing the density of the Mg$_2$Si phases, the number of generation of the Al/MgZn$_2$/Zn ternary eutectic phase is increased, and as a result, the ternary eutectic phases are made fine.

Figure 5:
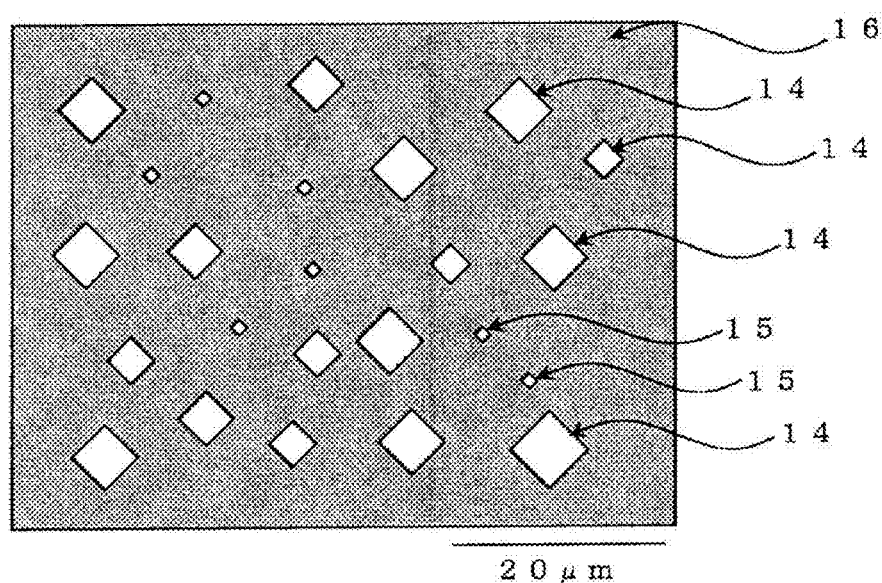
FIG. 5 is a schematic view of a photograph of which a coating layer of the hot-dip galvanized steel sheet of the present invention is dissolved by 0.5% hydrochloric acid containing inhibitors and then its surface is photographed by an SEM at 2000 magnifications.

The coating layer is dissolved by 0.5% hydrochloric acid containing inhibitors, thereby making it possible to dissolve and remove constituent phases of the coating layer other than the Mg$_2$Si phases. Therefore, in the present invention, in order to measure the density of the Mg$_2$Si phases existing at the interface between the coating layer and the base steel sheet, the coating layer is dissolved by 0.5% hydrochloric acid containing inhibitors to thereby dissolve and remove the constituent phases of the coating layer other than the Mg$_2$Si phases. Thereafter, from the surface, SEM observation may be performed to measure the number density of the remaining Mg$_2$Si phases. Further, in order to measure the circle-equivalent diameter of the Mg$_2$Si phase, on an SEM photograph taken as described previously, the targeted Mg$_2$Si phases are image processed to obtain a projected area and the circle-equivalent diameter is calculated. By using such a method, it is possible to obtain the density of the Mg$_2$Si phases each having a circle-equivalent diameter of 2 μm or more. FIG. 5 shows a schematic view when the coating layer is dissolved by 0.5% hydrochloric acid containing inhibitors and then SEM observation is performed from the surface to take a photograph at 2000 magnifications. In FIG. 5, each symbol 14 denotes the Mg$_2$Si phase having a circle-equivalent diameter of 2 μm or more and each symbol 15 denotes the Mg$_2$Si phase having a circle-equivalent diameter of less than 2 μm. In an example in FIG. 5, 17 pieces of the Mg$_2$Si phases 14 each having a circle-equivalent diameter of 2 μm or more exist in the SEM photograph at 2000 magnifications. This photograph is one obtained by photographing a 63 μm×48 μm region, so that in the example in FIG. 5, the density of the Mg$_2$Si phases 14 each having a circle-equivalent diameter of 2 μm or more results in 56 pieces per 0.01 mm$^2$ In the present invention, at the interface between the coating layer and the base steel sheet, the density of the Mg$_2$Si phases 14 each having a circle-equivalent diameter of 2 μm or more needs to be 10 to 1000 pieces per 0.01 mm$^2$.

(Average Diameter of the Al/MgZn$_2$/Zn Ternary Eutectic Phases)

In the present invention, an average diameter of the Al/MgZn$_2$/Zn ternary eutectic phases out of the constituent phases of the coating layer is set to be in a range of 5 to 200 μm. Even though the Ca phases exist at the interface between the coating layer and the base steel sheet, it is difficult to bring the average diameter of the Al/MgZn$_2$/Zn ternary eutectic phases to less than 5 μm and the cost is likely to be high. On the other hand, when the average diameter of the Al/MgZn$_2$/Zn ternary eutectic phases exceeds 200 μm, the effect of which the Al/MgZn$_2$/Zn ternary eutectic phase fills the dendritic portion of the Al phase becomes small, thereby making it impossible to secure the appearance uniformity. In terms of the appearance uniformity, the average diameter of the ternary eutectic phases is preferably set to be in a range of 10 to 100 μm, and further is more preferably set to be in a range of 20 to 50 μm.

As a method of measuring the average diameter of the Al/MgZn$_2$/Zn ternary eutectic phases, there is conceivable a method in which the coating layer is EBSD measured from the surface direction and the average diameter is obtained by data processing. In the EBSD measurement, in order to improve a measuring speed, the measurement is performed on the assumption that the Al/MgZn$_2$/Zn ternary eutectic phase is a Zn phase. When data of the Al/MgZn$_2$/Zn ternary eutectic phase measured as the Zn phase is data processed to calculate the average diameter, the average diameter of the Al/MgZn$_2$/Zn ternary eutectic phases can be obtained. In this case, the coating layer is EBSD measured from the surface direction and a boundary having a misorientation between adjacent crystal grains of 15° or more is defined as a grain boundary of the ternary eutectic phase and crystal grains in a grain unit surrounded by the grain boundary correspond to the single ternary eutectic phase.

Figure 6:
FIG. 6 is a view showing one example of data obtained after EBSD measurement is performed on the hot-dip galvanized steel sheet of the present invention for obtaining an average diameter of $Al/MgZn_2/Zn$ ternary eutectic phases and grain boundaries are drawn by a solid line.

FIG. 6 shows one example of the data obtained by EBSD measuring the coating layer from the surface direction on the assumption that the Al/MgZn$_2$/Zn ternary eutectic phase is the Zn phase. As described above, the boundary having a misorientation between adjacent crystal grains of 15° or more is defined as a grain boundary of the ternary eutectic phase and crystal grains in a grain unit surrounded by the grain boundary are determined as the single ternary eutectic phase. When the average diameter of the Al/MgZn$_2$/Zn ternary eutectic phases is obtained by data processing from such data, in the example shown in FIG. 6, the average diameter of the Al/MgZn$_2$/Zn ternary eutectic phases is 46 μm.

(Manufacturing Method)

Next, there will be explained a manufacturing method of the hot-dip galvanized steel sheet.

In an in-line cleaning section of a CGL, alkaline degreasing and brush cleaning are performed, and thereby oil-dirt on the base steel sheet (coating original sheet) is cleaned and removed. Thereafter, before performing hot-dip galvanizing, the Ca phases each mainly composed of Ca or a Ca compound are bonded to the surface of the base steel sheet.

As a method of bonding the Ca phases to the surface of the base steel sheet, there is conceivable a method in which for example, in the cleaning section on the entrance side of the CGL, oil-dirt on the surface of the coating original sheet is removed, and then the base steel sheet is dipped into a hot water containing Ca, and Ca is made to precipitate in a compound state on the surface of the base steel sheet. Incidentally, when alkaline cleaning and degreasing, it is also possible that by using a cleaning liquid containing Ca or the like, Ca phases are formed on the surface of the base steel sheet and the hot water dipping is omitted.

In this case, it is desirably dipped into a hot water containing 10 to 40 ppm of Ca in mass %. When the concentration of Ca is less than 10 ppm, it is not possible to sufficiently bond the Ca phases to the surface of the base steel sheet and it is not possible to secure the appearance uniformity after the hot-dip galvanizing. Thus, the lower limit is set to 10 ppm. Further, when 40 ppm or more of Ca is contained in a hot water, an effect of improving the appearance uniformity is saturated, and further uncoating occurs, so that the upper limit is set to 40 ppm. Further, when the temperature of the hot water containing Ca is set to 50° C. or higher, the Ca phases are formed on the surface of the base steel sheet, but when it is set to higher than 90° C., spot rusting occurs on the base steel sheet during the dipping, so that the temperature of the hot water is set to be in a range of 50 to 90° C. Further, the time when the base steel sheet is dipped into the hot water containing Ca is set to be in a range of 1 to 100 s. When the dipping is performed for 1 s or longer, the Ca phases are formed on the surface of the base steel sheet, and even if the dipping is performed for longer than 100 s, the Ca phases to be bonded are saturated, so that the upper limit is set to 100 s.

After the above-described processes are performed, in an annealing section of the CGL, annealing is performed. Annealing conditions, an annealing atmosphere, and so are not limited in particular, and appropriate conditions may be selected from a line structure of the CGL, a sheet thickness of a product, a targeted mechanical characteristic value, and so on.

After the annealing is completed, the base steel sheet is dipped into a hot-dip galvanizing bath containing Al: 4 to 22 mass %, Mg: 1 to 6 mass %, and Si: 0.001 to 1 mass %, and a balance being composed of Zn and inevitable impurities to perform hot-dip galvanizing. A temperature of the coating bath is set to be in a range of 420 to 470° C. in terms of the appearance uniformity. The time of dipping into the coating bath is not limited in particular, but a predetermined dipping time may be secured according to a line speed of the base steel sheet. After pulling out of the coating bath, by nitrogen gas wiping, the coating is adjusted to a predetermined coating weight.

No restriction is provided on the coating weight in particular, but in terms of the corrosion resistance, the coating weight is desirably 10 g/m² or more in one side coating weight. Further, in terms of the workability, it does not exceed 350 g/m² in one side coating weight desirably. Even though on the hot-dip galvanized steel sheet of the present invention, upper coating is performed, and various treatments such as, for example, a chromate treatment, a non-chromate treatment, a phosphating treatment, a lubrication improving treatment, and a weldability improving treatment are performed for the purpose of improving paintability and weldability, they do not depart from the present invention.

EXAMPLE

Hereinafter, the present invention will be explained concretely by an example, but the present invention is not limited to this example.

First, a cold-rolled steel sheet having a thickness of 1.6 mm in a state of a cold rolling oil being attached to its surface was prepared to be set as a base steel sheet (coating original sheet). This was subjected to alkaline spray degreasing and brush cleaning to clean the surface completely. Additionally, there was also fabricated a base steel sheet (coating original sheet) that was not subjected to brush cleaning after being subjected to alkaline spray degreasing to thus have a surface on which oil-dirt was left. Thereafter, these base steel sheets were dipped into a hot water containing Ca (mass %). Details of dipping conditions are shown in Table 1. Thereafter, in an annealing furnace of a CGL, annealing was performed, hot-dip coating was performed for three seconds in a hot-dip galvanizing bath at 450° C. in which the Al content, Mg content, Si content, Ti content were changed, and then a coating weight was adjusted by $N_2$ gas wiping.

TABLE 1

| CONDITION SYMBOL | IN-WATER Ca CONCENTRATION (ppm) | WATER TEMPERATURE (° C.) | DIPPING TIME (s) | NOTE |
|---|---|---|---|---|
| A | 3 | 30 | 1 | COMPARATIVE EXAMPLE |
| B | 10 | 50 | 5 | PRESENT INVENTION EXAMPLE |
| C | 20 | 60 | 10 | PRESENT INVENTION EXAMPLE |
| D | 25 | 65 | 20 | PRESENT INVENTION EXAMPLE |
| E | 30 | 70 | 80 | PRESENT INVENTION EXAMPLE |
| F | 40 | 90 | 90 | PRESENT INVENTION EXAMPLE |

With regard to a coated steel sheet manufactured by using the completely cleaned coating original sheet, a coating layer composition, interface Ca intensity and an average diameter of $Al/MgZn_2/Zn$ ternary eutectic phases at an interface between a coating layer and the base steel sheet, and a density of $Mg_2Si$ phases each having a circle-equivalent diameter of 2 μm or more existing at the interface between the coating layer and the base steel sheet were each evaluated.

The interface Ca intensity at the interface between the coating layer and the base steel sheet was obtained in a manner that as described previously, a depth direction analysis is performed from a surface layer of the coating layer by using a GDS and the interface Ca intensity=(Ca peak intensity at the interface between the coating layer and the base steel sheet−background Ca intensity)/(the background Ca intensity) was calculated. For the background Ca intensity, Ca intensity obtained by performing a GDS analysis on a high-purity iron (JSS No. 003-6) was used.

With regard to the average diameter of the $Al/MgZn_2/Zn$ ternary eutectic phases, as described previously, EBSD measurement was performed from the surface of the coating layer on the assumption that the $Al/MgZn_2/Zn$ ternary eutectic phase was a Zn phase, and obtained measured data was data processed to thereby obtain the average diameter.

The density of the $Mg_2Si$ phases each having a circle-equivalent diameter of 2 μm or more existing at the interface between the coating layer and the base steel sheet was obtained in a manner that by dilute hydrochloric acid containing inhibitors, phases other than the $Mg_2Si$ phases out of constituent phases of the coating layer are dissolved and removed, and then the number of the $Mg_2Si$ phases each having a circle-equivalent diameter of 2 μm or more out of the remaining $Mg_2Si$ phases was measured by using an SEM photograph taken from the surface to be converted to the density per 0.01 mm².

With regard to the appearance uniformity of the coated steel sheet, appearances of the coating layers of the completely cleaned base steel sheet and the base steel sheet having had oil-dirt left thereon were each visually confirmed, and their evaluation was performed by rating an appearance difference on a six-point scale. Details of the evaluation were set to EX: the appearance difference cannot be confirmed at all, VG: the appearance difference can hardly be confirmed, G: the appearance difference can be confirmed slightly but no problem is caused at all in terms of actual use, F: the appearance difference can be confirmed but no problem is caused at all in terms of actual use, P: the definite appearance difference can be confirmed to cause a problem in terms of actual use, and VP: the definite appearance difference can be confirmed and value in terms of actual use is impaired significantly, and F and higher were set to be accepted.

The corrosion resistance of the coated steel sheet was evaluated by a corrosion loss after a CCT test. The coated steel sheet was cut into a size of 150×70 mm, and by using a CCT based on JASO-M609, a corrosion loss after CCT 30 cycles was examined. With regard to evaluation, the corrosion loss of less than 30 g/m² was set to F, the corrosion loss of 30 g/m² or more and less than 50 g/m² was set to ○, the corrosion loss of 50 g/m² or more to less than 70 g/m² was set to P, and the corrosion loss of 70 g/m² or more was set to VP, and F and lower were set to be accepted.

Results of the above evaluations are shown in Table 2. From Table 2, present invention examples are all excellent in both the appearance uniformity and the corrosion resistance. In contrast to this, comparative examples deviating from the range of the present invention are poorer in the appearance uniformity and the corrosion resistance as compared to the present invention examples. Incidentally, the balance of a coating composition (mass %) in Table 2 is zinc and inevitable impurities.

TABLE 2

| No. | COATING COMPOSITION (MASS %) | | | | | | | | | | | HOT WATER DIPPING CONDITION | INTERFACE Ca INTENSITY |
|---|---|---|---|---|---|---|---|---|---|---|---|---|---|
| | Al | Mg | Si | Ti | Zr | Sr | Hf | Sc | B | Ni | OTHERS | | |
| 1 | 4.1 | 1.1 | 0.001 | | | | | | | | | B | 0.10 |
| 2 | 4.0 | 5.9 | 0.01 | | | | | | | | | F | 0.92 |
| 3 | 6.1 | 2.0 | 0.02 | | | | | | | | | D | 0.22 |
| 4 | 8.3 | 2.8 | 0.05 | | | | | | | | | D | 0.41 |
| 5 | 14.8 | 4.7 | 0.14 | | | | | | | | | B | 0.12 |
| 6 | 19.6 | 5.1 | 0.18 | | | | | | | | | B | 0.18 |
| 7 | 21.5 | 1.0 | 0.25 | | | | | | | | | B | 0.18 |
| 8 | 21.8 | 5.9 | 0.53 | | | | | | | | | B | 0.19 |
| 9 | 1.9 | 0.1 | 0.28 | | | | | | | | | B | 0.10 |
| 10 | 6.1 | 3.0 | 0.01 | | | | | | | | | A | 0.01 |
| 11 | 9.9 | 2.6 | 0.18 | | | | | | | | | D | 0.42 |
| 12 | 11.3 | 3.1 | 0.72 | | | | | | | | | D | 0.45 |
| 13 | 12.0 | 3.6 | 0.11 | | | | | | | | | D | 0.55 |
| 14 | 12.9 | 3.8 | 0.2 | | | | | | | | | D | 0.48 |
| 15 | 9.8 | 2.5 | 0.8 | | | | | | | | | D | 0.51 |
| 16 | 9.7 | 2.4 | 0.15 | | | | | | | | | E | 0.53 |
| 17 | 11.0 | 3.1 | 0.21 | | | | | | | | | E | 0.64 |
| 18 | 11.9 | 3.4 | 0.24 | | | | | | | | | E | 0.65 |
| 19 | 13.2 | 4.0 | 0.29 | | | | | | | | | E | 0.72 |
| 20 | 12.8 | 3.8 | 0.001 | | | | | | | | | E | 0.73 |
| 21 | 8.8 | 2.4 | 0.83 | | | | | | | | | E | 0.74 |
| 22 | 10.2 | 2.6 | 0.14 | | | | | | | | | F | 0.79 |
| 23 | 10.8 | 3.0 | 0.22 | | | | | | | | | F | 0.81 |
| 24 | 11.8 | 3.4 | 0.25 | | | | | | | | | F | 0.92 |
| 25 | 13.2 | 4.1 | 0.32 | | | | | | | | | F | 0.84 |
| 26 | 12.9 | 3.7 | 0.21 | | | | | | | | | F | 0.88 |
| 27 | 10.9 | 2.8 | 0.22 | 0.001 | | | | | | | | D | 0.43 |
| 28 | 11.1 | 3.1 | 0.88 | 0.0045 | | | | | | | | E | 0.86 |
| 29 | 11.9 | 3.4 | 0.28 | 0.0081 | | | | | | | | C | 0.32 |
| 30 | 13.1 | 4.2 | 0.11 | | 0.0008 | | | | | | | D | 0.48 |
| 31 | 9.1 | 3.4 | 0.18 | | | 0.0012 | | | | | | C | 0.27 |
| 32 | 10.8 | 2.9 | 0.24 | | | | 0.0014 | | | | | C | 0.21 |
| 33 | 9.3 | 2.4 | 0.33 | | | | | 0.0011 | | | | E | 0.18 |
| 34 | 11.8 | 2.1 | 0.29 | | | | | | 0.0005 | | | E | 0.11 |
| 35 | 12.7 | 3.1 | 0.11 | | | | | | | 0.0021 | | D | 0.53 |
| 36 | 11.1 | 3.2 | 0.22 | | | | | | | | Fe: 0.006 | C | 0.33 |
| 37 | 12.6 | 3.7 | 0.18 | | | | | | | | Sb: 0.004 | D | 0.44 |
| 38 | 11.9 | 4.1 | 0.31 | | | | | | | | Pb: 0.003 Sc: 0.004 | F | 0.87 |
| 39 | 10.3 | 3.4 | 0.27 | | | | | | | | Ca: 0.003 | D | 0.45 |
| 40 | 10.7 | 3.6 | 0.21 | | | | | | | | Cr: 0.005 | E | 0.63 |
| 41 | 11.2 | 2.4 | 0.14 | | | | | | | | La: 0.003 Ce: 0.008 | C | 0.31 |
| 42 | 4.6 | 1.5 | — | | | | | | | | | C | 0.38 |

| No. | Mg₂Si DENSITY (PIECE/0.01 mm²) | AVERAGE DIAMETER OF TERNARY EUTECTIC (μm) | EVALUATION RESULT APPEARANCE UNIFORMITY | CORROSION RESISTANCE | NOTE |
|---|---|---|---|---|---|
| 1 | 2 | 322 | F | F | PRESENT INVENTION EXAMPLE |
| 2 | 3 | 294 | F | G | PRESENT INVENTION EXAMPLE |
| 3 | 5 | 247 | F | F | PRESENT INVENTION EXAMPLE |
| 4 | 6 | 225 | F | G | PRESENT INVENTION EXAMPLE |

TABLE 2-continued

| | | | | | |
|---|---|---|---|---|---|
| 5 | 12 | 212 | G | G | PRESENT INVENTION EXAMPLE |
| 6 | 25 | 240 | G | G | PRESENT INVENTION EXAMPLE |
| 7 | 12 | 233 | G | F | PRESENT INVENTION EXAMPLE |
| 8 | 27 | 206 | G | G | PRESENT INVENTION EXAMPLE |
| 9 | 22 | NOT FORMED | F | VP | COMPARATIVE EXAMPLE |
| 10 | 2 | 521 | VP | F | COMPARATIVE EXAMPLE |
| 11 | 34 | 186 | VG | G | PRESENT INVENTION EXAMPLE |
| 12 | 45 | 176 | VG | G | PRESENT INVENTION EXAMPLE |
| 13 | 50 | 153 | VG | G | PRESENT INVENTION EXAMPLE |
| 14 | 55 | 124 | VG | G | PRESENT INVENTION EXAMPLE |
| 15 | 68 | 137 | VG | G | PRESENT INVENTION EXAMPLE |
| 16 | 70 | 88 | VG | G | PRESENT INVENTION EXAMPLE |
| 17 | 80 | 84 | VG | G | PRESENT INVENTION EXAMPLE |
| 18 | 95 | 56 | VG | G | PRESENT INVENTION EXAMPLE |
| 19 | 87 | 67 | VG | G | PRESENT INVENTION EXAMPLE |
| 20 | 88 | 81 | VG | G | PRESENT INVENTION EXAMPLE |
| 21 | 78 | 73 | VG | G | PRESENT INVENTION EXAMPLE |
| 22 | 102 | 43 | VG | G | PRESENT INVENTION EXAMPLE |
| 23 | 110 | 36 | VG | G | PRESENT INVENTION EXAMPLE |
| 24 | 158 | 33 | VG | G | PRESENT INVENTION EXAMPLE |
| 25 | 234 | 51 | VG | G | PRESENT INVENTION EXAMPLE |
| 26 | 175 | 46 | VG | G | PRESENT INVENTION EXAMPLE |
| 27 | 58 | 20 | EX | G | PRESENT INVENTION EXAMPLE |
| 28 | 78 | 10 | EX | G | PRESENT INVENTION EXAMPLE |
| 29 | 21 | 5 | EX | G | PRESENT INVENTION EXAMPLE |
| 30 | 34 | 22 | EX | G | PRESENT INVENTION EXAMPLE |
| 31 | 22 | 15 | EX | G | PRESENT INVENTION EXAMPLE |
| 32 | 20 | 17 | EX | G | PRESENT INVENTION EXAMPLE |
| 33 | 11 | 24 | EX | G | PRESENT INVENTION EXAMPLE |
| 34 | 77 | 28 | EX | G | PRESENT INVENTION EXAMPLE |
| 35 | 44 | 21 | EX | G | PRESENT INVENTION EXAMPLE |
| 36 | 27 | 52 | VG | G | PRESENT INVENTION EXAMPLE |
| 37 | 35 | 78 | VG | G | PRESENT INVENTION EXAMPLE |
| 38 | 123 | 108 | VG | G | PRESENT INVENTION EXAMPLE |
| 39 | 48 | 82 | VG | G | PRESENT INVENTION EXAMPLE |
| 40 | 89 | 83 | VG | G | PRESENT INVENTION EXAMPLE |
| 41 | 20 | 187 | VG | G | PRESENT INVENTION EXAMPLE |
| 42 | 0 | 501 | VP | F | COMPARATIVE EXAMPLE |

EXPLANATION OF CODES 1 coating original sheet
2 Al phase
3 MgZn2 phase
4 Al/MgZn$_2$/Zn ternary eutectic phase
5 Mg$_2$Si phase
6 place where there are a lot of Al/MgZn$_2$/Zn ternary eutectic phases on a surface
7 place where an Al phase is exposed to a surface
8 Zn coating layer
9 coating original sheet
10 Mg$_2$Si phase
11 Ca phase
12 Mg$_2$Si phase that has precipitated by using a Ca phase as a nucleus
13 peak Ca intensity at an interface between a coating layer and a steel sheet
14 Mg$_2$Si phase having a circle-equivalent diameter of 2 μm or more
15 Mg$_2$Si phase having a circle-equivalent diameter of less than 2 μm
16 coating original sheet

The invention claimed is:

1. A high-corrosion-resistance hot-dip galvanized steel sheet having excellent appearance uniformity, comprising:
a coating layer containing Al: 4 to 22 mass %, Mg: 1 to 6 mass %, and Si: 0.001 to 1 mass %, and a balance being composed of Zn and inevitable impurities formed on a surface, wherein
at an interface between said coating layer and a base steel sheet, Mg$_2$Si phases and Ca phases each mainly composed of Ca or a Ca compound exist, and at least part of the Mg$_2$Si phases precipitate by using the Ca phases as a nucleus,
an average diameter of Al/MgZn$_2$/Zn ternary eutectic phases existing in said coating layer is 5 to 200 μm, and
an interface Ca intensity at the interface between said coating layer and the base steel sheet is 0.1 to 1.0.

2. The high-corrosion-resistance hot-dip galvanized steel sheet having excellent appearance uniformity according to claim 1, wherein
a density of the Mg$_2$Si phases each having a circle-equivalent diameter of 2 μm or more out of the Mg$_2$Si phases existing at the interface between said coating layer and the base steel sheet is 10 to 1000 pieces per 0.01 mm$^2$.

3. The high-corrosion-resistance hot-dip galvanized steel sheet having excellent appearance uniformity according to claim 1, wherein
said coating layer further contains 0.000001 to 0.5 mass % of one or two or more selected from Ti, Ni, Zr, Sr, Hf, Sc, and B alone or in combination.

4. A manufacturing method of a high-corrosion-resistance hot-dip galvanized steel sheet having excellent appearance uniformity, comprising:
a step of bonding Ca phases each mainly composed of Ca or a Ca compound to a surface of a base steel sheet;
a step of annealing the base steel sheet having had the Ca phases bonded to the surface; and
a step of dipping the base steel sheet into a hot-dip galvanizing bath containing Al: 4 to 22 mass %, Mg: 1 to 6 mass %, and Si: 0.001 to 1 mass %, and a balance being composed of Zn and inevitable impurities and performing hot-dip galvanizing, wherein an average diameter of Al/MgZn$_2$/Zn ternary eutectic phases existing in a coating layer formed on a surface of the base steel sheet is 5 to 200 μm, and in said step of bonding Ca or a Ca compound to the surface of the base steel sheet, the base steel sheet is dipped into a hot water containing Ca of 10 to 40 mass ppm and having a temperature of 50 to 90° C. for 1 to 100 s.

5. The high-corrosion-resistance hot-dip galvanized steel sheet having excellent appearance uniformity according to claim 2, wherein said coating layer further contains 0.000001 to 0.5 mass % of one or two or more selected from Ti, Ni, Zr, Sr, Hf, Sc, and B alone or in combination.

* * * * *